United States Patent
Terruzzi (10) Patent No.: US 12,514,884 B2
(45) Date of Patent: Jan. 6, 2026

(54) COMPOSITION FOR USE IN THE TREATMENT OF GROUP-B STREPTOCOCCUS (GBS) INFECTIONS

(71) Applicant: BIOFARMA S.R.L, Mereto di Tomba (IT)

(72) Inventor: Carlo Terruzzi, Caglio (IT)

(73) Assignee: BIOFARMA S.R.L, Mereto di Tomba (IT)

( * ) Notice: Subject to any disclaimer, the term of this patent is extended or adjusted under 35 U.S.C. 154(b) by 567 days.

(21) Appl. No.: 17/996,720

(22) PCT Filed: Apr. 21, 2021

(86) PCT No.: PCT/EP2021/060394
§ 371 (c)(1),
(2) Date: Oct. 20, 2022

(87) PCT Pub. No.: WO2021/214139
PCT Pub. Date: Oct. 28, 2021

(65) Prior Publication Data
US 2023/0263840 A1    Aug. 24, 2023

(30) Foreign Application Priority Data
Apr. 21, 2020  (EP) .................................. 20170598

(51) Int. Cl.
| | | |
|---|---|---|
| A61K 35/742 | (2015.01) | |
| A61K 9/48 | (2006.01) | |
| A61K 38/40 | (2006.01) | |
| A61P 31/06 | (2006.01) | |

(52) U.S. Cl.
CPC .............. *A61K 35/742* (2013.01); *A61K 9/48* (2013.01); *A61K 38/40* (2013.01); *A61P 31/06* (2018.01)

(58) Field of Classification Search
None
See application file for complete search history.

(56) References Cited

FOREIGN PATENT DOCUMENTS

| AU | 2016100865 A4 | 7/2016 |
|---|---|---|
| WO | 2018210807 A1 | 11/2018 |

OTHER PUBLICATIONS

Di Cerbo A. et al., "Mechanisms and therapeutic effectiveness of lactobacilli", J. Clin Pathol 2016; 69:187-203.
International Preliminary Report on Patentability of PCT/EP2021/060394 of May 9, 2022.
Olsen P. et al., "The impact of oral probiotics on vaginal Group B Streptococcal colonisation rates in pregnant women: a pilot randomised control study", Women and Birth 31 (2018) 31-37.
Ortiz L. et al., "Effect of two probiotic strains of Lactobacillus on In Vitro adherence of Listeria monocytogenes, *Streptococcus agalactiae*, and *Staphylococcus aureus* to vaginal epithelial cells", Curr Microbiol vol. 68, No. 6, Jun. 1, 2014, pp. 679-684.
Russo R et al., "Evidence-based mixture containing Lactobacillus strains and lactoferrin to prevent recurrent bacterial vaginosis: a double blind, placebo controlled, randomised clinical trial", Beneficial Microbes, 2019, 10(1): 19-26.
Russo R et al., "Study on the effects of an oral lactobacilli and lactoferrin complex in women with intermediate vaginal microbiota", Archives of Gynecology and Obstetrics (2018) 298:139-145.
Search Report and Written Opinion of PCT/EP2021/060394 of Aug. 13, 2021.
Superti F. et al., "Warding off recurrent yeast and bacterial vaginal infections: Lactoferrin and Lactobacilli", Microorganisms, 2020, 8, 130.

*Primary Examiner* — Brian Gangle
(74) *Attorney, Agent, or Firm* — Silvia Salvadori, P.C.; Silvia Salvadori (57) ABSTRACT

The present invention concerns the field of bacterial infections, and in particular Group-B *Streptococcus* (GBS) infections during and after pregnancy. The present invention relates to the use of a composition comprising a strain of *Lactobacillus acidophilus*, a strain of *Lactobacillus rhamnosus*, and lactoferrin in the preventive and/or curative treatment of Group-B *Streptococcus* (GBS) infections.

18 Claims, 4 Drawing Sheets
Specification includes a Sequence Listing.

SEQUENCE LISTING

```
<160> NUMBER OF SEQ ID NOS: 1

<210> SEQ ID NO 1
<211> LENGTH: 550
<212> TYPE: DNA
<213> ORGANISM: Artificial Sequence
<220> FEATURE:
<223> OTHER INFORMATION: region from the 16s rRNA gene

<400> SEQUENCE: 1
tggagagttt gatcctggct caggacgaac gctggcggcg tgcctaatac atgcaagtcg      60
agcgagctga accaacagat tcacttcggt gatgacgttg ggaacgcgag cggcggatgg     120
gtgagtaaca cgtggggaac ctgccccata gtctgggata ccacttggaa acaggtgcta     180
ataccggata agaaagcaga tcgcatgatc agcttataaa aggcggcgta agctgtcgct     240
atgggatggc cccgcggtgc attagctagt tggtagggta acggcctacc aaggcaatga     300
tgcatagccg agttgagaga ctgatcggcc acattgggac tgagacacgg cccaaactcc     360
tacgggaggc agcagtaggg aatcttccac aatggacgaa agtctgatgg agcaacgccg     420
cgtgagtgaa gaaggttttc ggatcgtaaa gctctgttgt tggtgaagaa ggatagaggt     480
agtaactggc ctttatttga cggtaatcaa ccagaaagtc acggctaact acgtgccagc     540
agccgcggta                                                            550
```

COMPOSITION FOR USE IN THE TREATMENT OF GROUP-B STREPTOCOCCUS (GBS) INFECTIONS

Sequence listing SS118-1052.xml, created on Oct. 20, 2022 and of size of 2840 bytes is incorporated herein by reference.

This application is a U.S. national stage of PCT/EP2021/060394 filed on 21 Apr. 2021, which claims priority to and the benefit of European Application No. 20170598.5 filed on 21 Apr. 2020, the contents of which are incorporated herein by reference in their entireties.

Sequence listing Sequence, created on Oct. 20, 2022 and of size of 1.132 bytes is incorporated herein by reference.

FIELD OF THE INVENTION

The present invention concerns the field of bacterial infections, and in particular Group-B *Streptococcus* (GBS) infections during and after pregnancy.

The present invention relates to the use of a composition comprising a strain of *Lactobacillus acidophilus*, a strain of *Lactobacillus rhamnosus*, and lactoferrin in the preventive and/or curative treatment of Group-B *Streptococcus* (GBS) infections.

STATE OF THE ART

*Streptococcus agalactiae* or Group B *Streptococcus* (GBS) is an important cause of morbidity and mortality both for mothers and newborns worldwide. The gastro-intestinal tract represents a natural reservoir of GBS from which this bacterium could move and colonize the vagina. Studies performed in the USA show that 10-35% of pregnant women are asymptomatic carriers of GBS. Colonization could be an occasional, chronic or intermittent event. The most important risk factor for neonatal infection is the presence of the pathogen bacterium in the mother's uro-genital tract during the delivery and following fetal passage through the birth canal. Alternatively, the pathogen bacteria can reach the amniotic liquid for ascending pathway after the membranes rupture, although this latter event is not needful for the bacterial colonization.

Concerning the pathogenesis of late neonatal infection, it is assumed that the transmission is horizontal. Among the factors responsible for the infection, the tight contact with mother, breast feeding and nosocomial transmission may be mentioned. The main problem correlated to the presence of the GBS in both mothers' urogenital and gastrointestinal tracts is represented by asymptomatic colonization. Indeed, asymptomatic bacteriuria is often found during pregnancy. Among the asymptomatic forms, the clinical manifestations in pregnant women include chorioamnionitis, cystitis, pyelonephritis and febrile bacteremia, as well as fever and endometritis in the puerperium. Moreover, this pathogen agent may be correlated with a prolonged labor, premature membranes rupture (PROM) and preterm delivery (PPT). Less usually, it is linked to infection of surgery wound after caesarean section, pelvic abscesses, pelvic septic thrombophlebitis and osteomyelitis.

At birth, 50-65% of newborns from colonized mothers show GBS in external ear conduct, pharynx, umbilicus, and anorectal tract.

About 98% of newborn showing signs of colonization does not develop the infection; nevertheless, this infection happens in 1-2% of cases.

GBS can cause two different clinical manifestations: early and late neonatal infection. The first one (early infection) happen within the first 7 days after birth and its main symptom is respiratory distress. Pneumonia and septicemia are the most common clinical manifestations, while 5-10% of newborns shows meningitis. The early infection is 10 times more frequent in preterm children.

The late infection happens between 7 days and 3 months after birth. Such patients are usually pre-term born, and often develop meningitis, sepsis, and osteoarticular infections. More than 20% of newborns surviving meningitis caused by GBS, develop permanent neurological damages, such as sensorineural deafness, mental retardation, cortical blindness. Mortality rate in USA is significantly decreased during the last 3 decades: from 50% in 1970 to 6% in 1990; more recent data form CDC show a lower rate.

The diagnosis in pregnant women is performed by:
Cultural assay for searching the pathogen bacterium from either vaginal or anorectal swab;
Urinoculture test.

The diagnosis in newborn is performed by:
Cultural assay for searching the pathogen bacterium from either nose-pharyngeal or ear swab;
Hemoculture;
Cerebrospinal liquid examination.

Today, the most effective procedure for reducing the incidence of early neonatal infection is the screening of pregnant women aimed to identify the pathogen bacterium (without any symptom) and intrapartum antibiotic therapy. This latter seems to be the best way to prevent mother complications, infection and neonatal events. It could be performed on a basis of a cultural screening during the $35^{th}$ to $37^{th}$ week of pregnancy or considering both prenatal or intrapartum risks factors such as:

Vaginal rectal colonization during $35^{th}$-$37^{th}$ week of pregnancy;
Preterm delivery;
Without results from the swabs, considering the medical history and in particular: preterm delivery (<37 week), pPROM, PROM from more than 18 hours, fever during the delivery (>38° C. or 100° F.), previous newborn resulted positive to GBS, mother urinoculture positive for GBS.

Oral antibiotic therapy during pregnancy, before labor, is indicated only in case of GBS precedence in urine samples while the vaginitis caused by GBS is not an indication for the treatment.

Intrapartum prophylaxis must be performed by administering penicillin or ampicillin every 4 hours until delivery. The antibiotic treatment of the newborn at risk of infection must be carried out only after diagnosis and clinical manifestations of infection.

A vaccine against GBS infection is not yet available.

In view of the current lack of treatment for GBS, which would allow to avoid complications and infection to the mother and the newborn, the need and importance is increasingly felt for the development of an alternative treatment to the use of antibiotic therapy during pregnancy and labor.

SUMMARY OF THE INVENTION

The problem underlying the present invention is that of making available treatments for the prevention and treatment of Group-B *Streptococcus* infections.

This problem is resolved by the present finding by the use of a composition comprising a strain of *Lactobacillus acidophilus*, a strain of *Lactobacillus rhamnosus*, and lactoferrin in the preventive and/or curative treatment of Group-B *Streptococcus* (GBS) infections.

As will be further described in the detailed description of the invention, the composition of the present invention has the advantages of allowing for the treatment of *Streptococcus agalactiae* infections without the use of antibiotics.

BRIEF DESCRIPTION OF THE DRAWINGS

The characteristics and advantages of the present invention will be apparent from the detailed description reported below, from the Examples given for illustrative and non-limiting purposes, and from the annexed FIGS. 1 and 2, wherein:

FIGS. 1A, 1B and 1C show the growth inhibition of GBS after 6, 12 and 24 hours, respectively.

DETAILED DESCRIPTION OF THE INVENTION

The present invention concerns a composition comprising a strain of *Lactobacillus acidophilus*, a strain of *Lactobacillus rhamnosus*, and lactoferrin for use in the preventive and/or curative treatment of Group-B *Streptococcus* (GBS) infections. The composition comprising a strain of *Lactobacillus acidophilus*, a strain of *Lactobacillus rhamnosus*, and lactoferrin is suitable for use in the preparation of a medicament for the preventive and/or curative treatment of Group-B *Streptococcus* (GBS) infections. Lactobacilli, such as *Lactobacillus acidophilus* and *Lactobacillus rhamnosus*, are microorganisms exerting several beneficial effects for human health when administered in adequate amount. For this reason, they are considered probiotics. *Lactobacillus* spp. represents the microorganism category which is predominant in the healthy vaginal ecosystem. Lactobacilli contribute to the vaginal homeostasis by balancing the different bacterial populations through the production of antimicrobial substances able to prevent the growth of pathogenic microorganisms. In addition, they also produce lactic acid, which maintains physiological low vaginal pH, thus contributing to a healthy vaginal environment. Alterations in the microbial composition of vaginal ecosystem are linked to several adverse health outcomes such as bacterial vaginosis (BV) and aerobic vaginitis (AV).

Lactoferrin (Lf) is a safe, natural component of most exocrine biological fluids, including tears, milk, saliva and vaginal secretions, and deserves attention as a possible therapeutic agent. Lf is a ~80 kDa iron binding multifunctional glycoprotein constituting one of the major immunomodulatory components of the innate immune system. Other biological activities of Lf described in the scientific literature include antimicrobial activity against a wide range of pathogenic bacteria, fungi, protozoa and viruses, as well as anti inflammatory, and iron carrier. As other milk glycoconjugates, Lf functions as soluble receptor mimetic that inhibits pathogen binding to the mucosal cell surface. Despite Lf's broad spectrum of antimicrobial and immunomodulatory activities mentioned above, relatively little is known about Lf's capacity to modulate the growth of vaginal bacteria.

Without being bound to any theory, the mechanism of action responsible for the prevention of GBS infection in women is the direct effect due to the antimicrobial effect of the composition of the invention in the gut. In fact, the intestine represents the reservoir of many pathogen microbes causing diseases in humans, such as lower genito-urinary infections. Our composition is able to drastically reduce the GBS's proliferation and consequently its migration and colonization of the lower urogenital tract.

In our previous experimental studies we found that a combination of lactobacilli (i.e. *L. acidophilus* and *L. rhamnosus*) exerted antimicrobial effects by inhibiting the proliferation and growth of some specific pathogen and opportunistic bacteria. In particular, we showed that the probiotic combination induced a significant effect *Staphylococcus aureus* and *Escherichia coli* which are considering the most common cause of lower urinary tract infections. On the contrary, nothing is known about the effects of this complex against GBS.

Based on the above mentioned evidence, we investigated the ability of selected Lactobacilli, mainly *Lactobacillus acidophilus* and *Lactobacillus rhamnosus*, alone or in combination, and in the presence or absence of Lf, preferably bovine lactoferrin, on the growth and proliferation of GBS.

Surprisingly the inventors found that when combining together a strain of *Lactobacillus acidophilus*, a strain of *Lactobacillus rhamnosus*, and lactoferrin in a composition, the composition had a synergic effect on GBS.

Figure 1A:
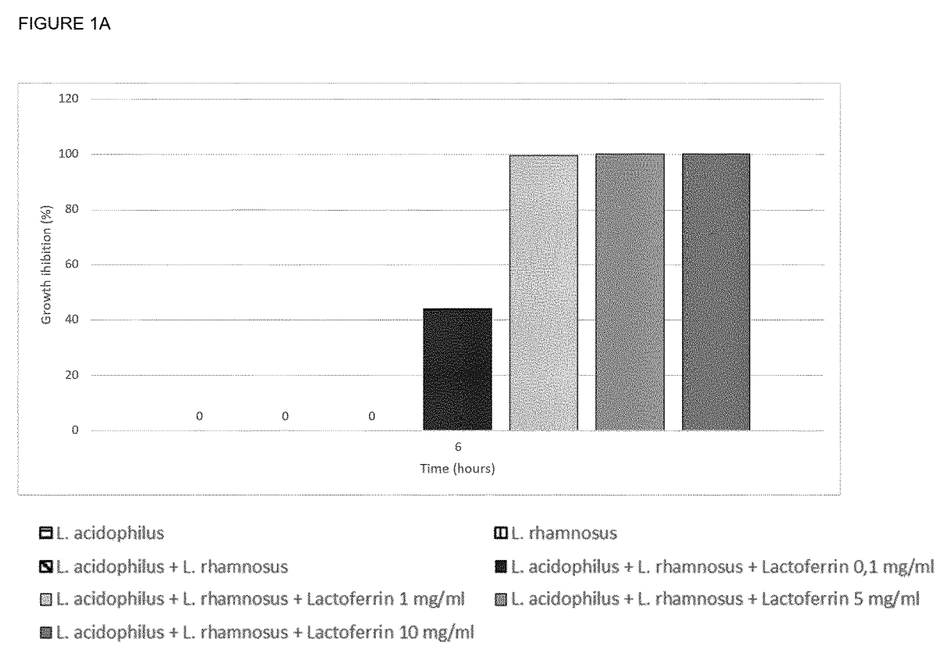
FIGS. 1A, 1B and 1C: show graphs reporting the growth inhibition of GBS ($10^6$ CFU) after different treatment with *L. acidophilus*, *L. rhamnosus*, the mixture of both lactobacilli, and the mixture in combination with lactoferrin (in the range of 0.1 to 10 mg/ml). Both lactobacilli strains were used at $10^7$ CFU as described in Example 7.
Figure 1B:
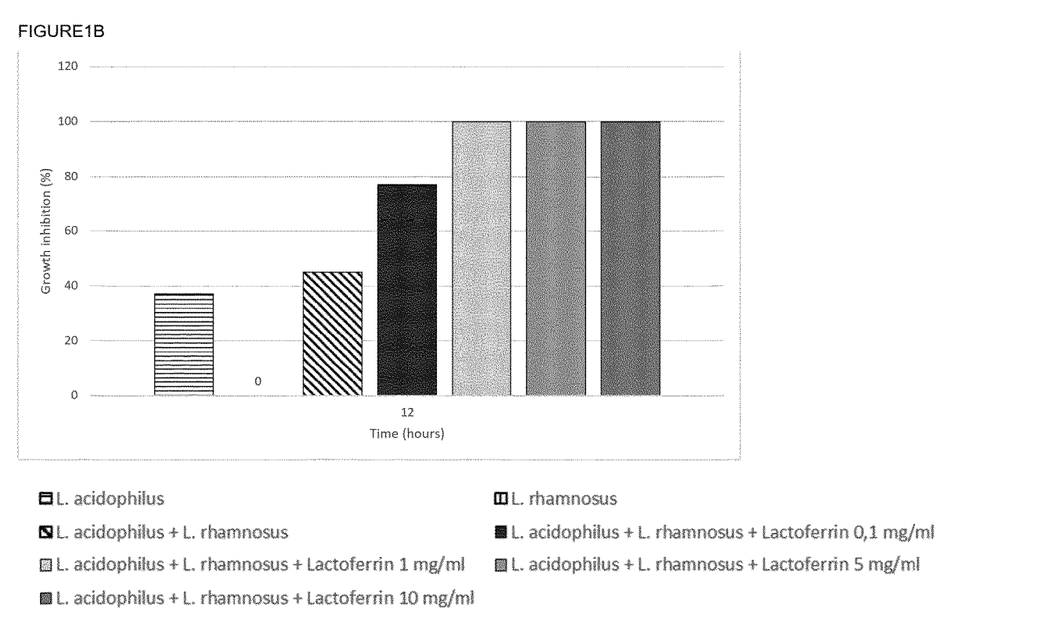
Figure 1C:
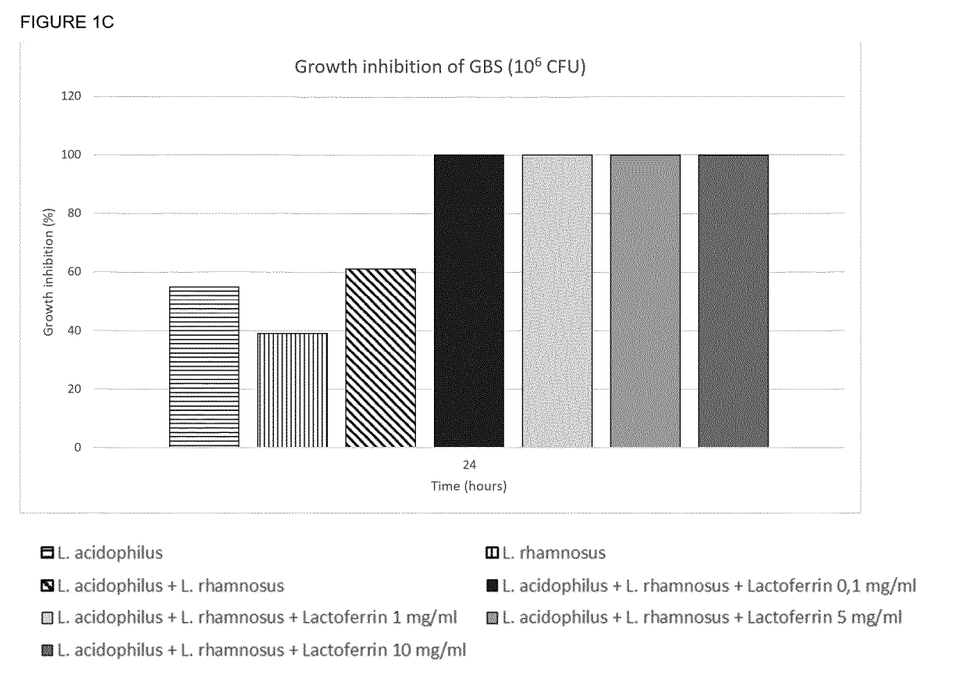
Figure 2:
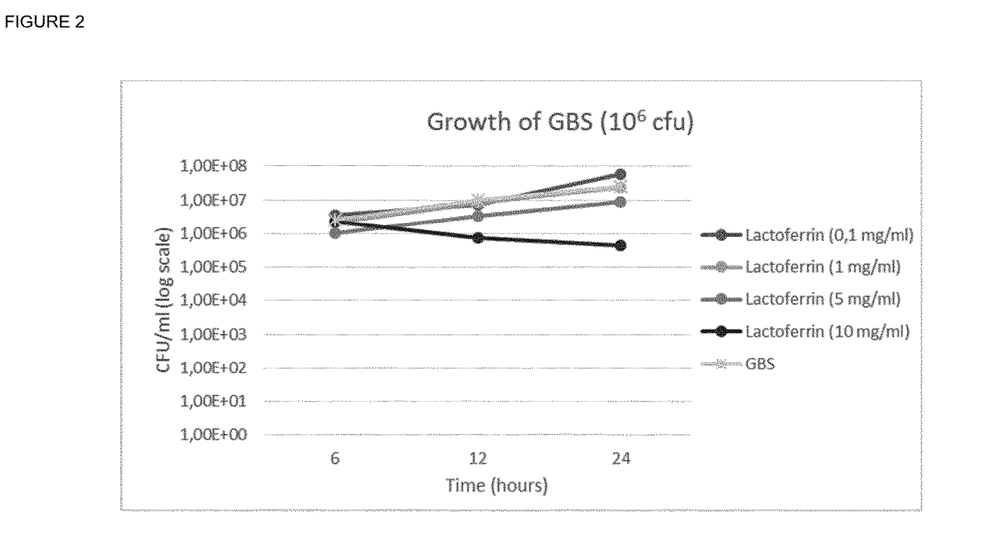
FIG. 2: shows a graph reporting the growth of GBS in presence of lactoferrin (Lf).

The results shown in FIGS. 1 and 2 and described in Example 7 show that neither *Lactobacillus acidophilus* nor *Lactobacillus rhamnosus*, inhibited the GBS growth neither alone nor in combination after 6 hours of incubation. A slight inhibition can be seen for *L. acidophilus* after 12 hours, whereas no significative inhibitory effects are exerted by lactoferrin alone at any of the incubation times.

Nevertheless, when combined together, the inhibitory effect of the *lactobacillus* strains resulted stronger and appeared earlier and were significantly enhanced when in combination with Lf, highlighting a synergic effect.

In a preferred aspect, the invention provides the use of a composition comprising a strain of *Lactobacillus acidophilus*, a strain of *Lactobacillus rhamnosus*, and lactoferrin, wherein said strain of *Lactobacillus acidophilus* and said strain of *Lactobacillus rhamnosus* are each independently of each other in a total concentration in a range from $10^7$ to $10^{12}$ CFU/dose, preferably $10^9$ CFU/dose.

In a further aspect, in the composition of the invention the strain of *Lactobacillus acidophilus* is chosen from the group consisting of *L. acidophilus* deposited with deposit number SD5212 (American Type Culture Collection or ATCC) and deposit number LMGS-29159 (Belgian Coordinated Collections of Microorganisms or BCCM/LMG of the Ghent University in Belgium), and other lactic acid bacteria belonging to the same species such as, but not limited to, *L. acidophilus* NCFM, *L. acidophilus* La-5, *L. acidophilus* Lafti L-10, *L. acidophilus* W22 and *Lactobacillus acidophilus* BIFOLAC 5 strains and the strain of *Lactobacillus rhamnosus* is chosen from the group consisting of *L. rhamnosus* deposited with deposit number SD5675 (ATCC), and other lactic acid bacteria belonging to the same species such as, but not limited to, *L. rhamnosus* Lr-32, *L. rhamnosus* GG, *L. rhamnosus* GR-1 and *L. rhamnosus* SP-1 strains.

In a still further aspect, in the composition of the invention said lactoferrin, preferably bovine lactoferrin, is in a total concentration in a range from 5 mg/dose to 300 mg/dose, preferably 50 mg/dose.

According to another aspect, the described invention provides the use of a composition comprising a strain of *Lactobacillus acidophilus*, a strain of *Lactobacillus rhamnosus*, and lactoferrin, said composition further comprising at least one additional component selected from the group consisting of: minerals, vitamins, probiotics, prebiotics, proteins or any mixtures thereof.

Preferably said minerals are selected from the group consisting of calcium, phosphorus, copper, magnesium, potassium, iron, selenium, sodium, zinc, manganese, chloride and iodine, said vitamins are selected from the group consisting of vitamin A, vitamin B1 (thiamin), vitamin B2 (riboflavin), vitamin B3 (niacin) vitamin B6, vitamin B8 (biotin), vitamin B112, vitamin C, vitamin D, vitamin E and folic acid, said probiotics are *Bifidobacterium* or lactic acid bacteria selected from the group consisting of *Lactobacillus bulgaricus, Lactobacillus casei, Lactobacillus bifidus, Lactobacillus reuteri, Lactobacillus crispatus, Lactobacillus gasseri, Lactobacillus plantarum, Lactobacillus jensenii, Lactobacillus delbrueckii, Lactobacillus fermentum, Lactobacillus iners, Lactobacillus helveticus*, and said proteins are selected from whey and casein.

In a more preferred aspect, the invention relates to the use of a composition comprising *Lactobacillus acidophilus* in a range from $10^7$ to $10^{12}$ CFU/dose, *Lactobacillus rhamnosus* in a range from $10^7$ to $10^{12}$ CFU/dose, lactoferrin in a range from 5 mg/dose to 300 mg/dose and pharmaceutically acceptable excipients.

Such pharmaceutically acceptable excipients can be but are not limited to, hydroxypropylmethylcellulose, starch, magnesium stearate and silicon dioxide. Other excipients are known to the person of ordinary skill in the art that can prepare the compositions according to the Examples.

Under another aspect the composition comprising a strain of *Lactobacillus acidophilus* and a strain of *Lactobacillus rhamnosus*, can be used in a daily dosage in the range from $10^7$ to $10^{12}$ CFU/dose, preferably $10^9$ CFU/dose where the ratio between *L. acidophilus* and *L. rhamnosus* ranges between 20:1 and 2:1, preferably 4:1 and *L. acidophilus* is always higher than *L. rhamnosus*.

Lactoferrin, preferably bovine lactoferrin, can be used in a daily dosage in the range of 5 mg/dose to 300 mg/dose preferably 50 mg/dose.

Such dosage is used in our ongoing multicentric clinical trial with 410 pregnant women randomized into 2 groups according to the treatment (verum or placebo). They will take one capsule of formulation per day from 32° to 37° week of pregnancy. Each capsule contains $5\times10^9$ CFU of Lactobacilli mixture (i.e. *L. acidophilus* and *L. rhamnosus*) and 50 mg of lactoferrin. In a preferred aspect, the composition for use according to the present invention is for oral administration, wherein said composition is in solid, liquid form, chosen from the group consisting of a tablet, a capsule, a powder, a granulate, a soluble stick, a liquid suspension.

The composition herein described is advantageously used in the prevention and/or the treatment of Group-B *Streptococcus* (GBS) infections occur during or after pregnancy. Various embodiments and aspects of the present invention as delineated hereinabove and as claimed in the claims section below find experimental support in the following examples.

EXAMPLES

Reference is now made to the following examples, which together with the above descriptions illustrate some embodiments of the invention.

Example 1

Preparation of the Composition According to the Invention (Capsules)

The composition according to the invention was prepared by weighing each raw material which are *L. acidophilus, L. rhamnosus*, lactoferrin, magnesium salts of fatty acids and silicon dioxide in a workshop with controlled humidity in the range of 20-30%. After that, each ingredient is sieved and introduced into the mixing machine and mixed in presence of nitrogen in order to remove oxygen as much as possible. The mixture (powder) is loaded into a hopper of a capsule machine for the production of HPMC capsules under controlled environmental conditions (temperature and humidity). After filling, capsules are transported to the blistering machine for the primary packaging in alu/alu blister or suitable jars.

Composition
Lactoferrin 54.3 mg
*L. acidophilus*+*L. rhamnosus:* $5\times10^9$ CFU
Hydroxypropyl methylcellulose 80 mg
Starch 53.6 mg
Magnesium salts of fatty acids 5 mg
Silicum dioxide 3.7 mg Example 2

Preparation of the Composition According to the Invention (Coated Tablets 1q)
Lactoferrin 60 mg
*L. acidophilus* $20\times10^9$
*L. rhamnosus* $5\times10^9$
Calcium phosphates 300 mg
Microcrystalline cellulose 150 mg
Magnesium salts of fatty acids 10 mg
Silicum dioxide 5 mg
Coating agent 50 mg
A blend of Hydroxypropyl methylcellulose with different viscosity (200 mg) and Methylcellulose 125 mg Example 3

Preparation of the Composition According to the Invention (Sachet 2 g)
Lactoferrin 100 mg
*L. acidophilus* $10\times10^9$
*L. rhamnosus* $2\times10^9$
Maltodextrin 1780 mg
Silicon dioxide 20 mg Example 4

Preparation of the Composition According to the Invention (Oral Stick Pack—Ready to Use 1.5 q)
Lactoferrin 50 mg
*L. acidophilus* $15\times10^9$
*L. rhamnosus* $5\times10^9$
Fructo-oligosaccarides 1000 mg
Sorbitol 335 mg
Biossido di silicio 15 mg

Example 5

Preparation of the Composition According to the Invention (Suspension in Oil 10 ml)
  Lactoferrin 30 mg
  *L. acidophilus* $6 \times 10^9$
  *L. rhamnosus* $3 \times 10^9$
  Sunflower oil up to 10 ml
  Mono-diglycerides of fatty acids 5 mg
  Vitamin E 15 mg

Example 6

Preparation of the Composition According to the Invention (Liquid Suspension)
  Vial 10 ml
  Plug: Lactoferrin 25 mg; *Lactobacillus* mixture $15 \times 10^9$ (*L acidophilus; L rhamnosus*) 75 mg, silicon dioxide 5 mg
  Vial: water, fructose, potassium sorbate, sodium benzoate, flavor, citric acid.

Example 7

In Vitro Analysis of Activity of the Composition of the Invention: Liquid Co-Culture Assay.

The capability of *L. acidophilus* and *L. rhamnosus*, alone and in combination with lactoferrin, to interfere with the growth of the GBS was evaluated by a liquid co-culture assay.

*Lactobacillus* strains (for example *L. acidophilus* and *L. rhamnosus*) were stored in milk yeast extract (MYE) at $-80°$ C.

Before the experiments, each strain was transferred from the frozen stock culture to MRS (De Man Rugosa Sharpe) broth incubated at 37° C. under non-agitated conditions. *Streptococcus agalactiae* was cultured in Brain Heart Infusion (BHI) broth.

The co-culture test was performed by incubating in Defined Medium Simulating Genital Tract Secretions (DMSGTS) (capable of sustaining the growth of both probiotics and pathogens) different concentrations of the probiotic strains ($10^7$ and $10^8$ cfu/mL), alone or in combination, with different concentrations ($10^6$ and $10^7$ cfu/mL) of the target pathogen. Probiotic strains were tested alone and in combination with lactoferrin at the following final concentrations: 0.1-1-5-10 mg/ml.

Controls were carried out by inoculating DMSGTS with the bacteria alone.

To check whether the pathogen was inhibited or killed, 0.05 mL of coculture suspensions were diluted and seeded on specific agar medium. After an incubation period at 37° C. for 6-24 h, bacterial growth was evaluated. No growth was interpreted as microbicidal activity (100% inhibition).

Statistical analysis was performed by Student's t-test for unpaired data. Data were expressed as the mean and SD and P values of <0.05 were considered significant.

Results

Results are shown in FIGS. 1 and 2.

Lactobacilli showed different effects on GBS growth when tested alone. In particular, *L. acidophilus* caused a slight growth inhibition after 12 hours of incubation with pathogen bacterium. On the contrary, *L. rhamnosus* did not reduced the bacterial growth after neither 6 nor 12 hours, and a slight inhibition was shown after 24 hours. Lactoferrin did not affect GBS growth significantly (FIG. 2). Surprisingly, when Lf was added to the lactobacilli mixture, the complex exerted more marked inhibition, which was significant already after 6 hours of incubation.

Such an effect was independent from the initial probiotic count (similar results were obtained with either $10^7$ and $10^8$ cfu/ml).

Conclusions

The results shown in FIGS. 1 and 2 clearly demonstrate the efficacy of the composition according to the invention (formulation of 2 lactobacilli, preferably *L. acidophilus* and *L. rhamnosus*, in combination with lactoferrin) for preventing and reducing the growth of GBS pathogen bacterium.

Neither *Lactobacillus acidophilus* nor *Lactobacillus rhamnosus*, inhibited the GBS growth alone nor in combination after 6 hours of incubation. A slight inhibition can be seen for *L. acidophilus* after 12 hours, whereas no significative inhibitory effects are exerted by lactoferrin alone at any of the incubation times.

Surprisingly, the effect of the lactobacilli combination was enhanced by lactoferrin, highlighting a synergic effect.

Considering that GBS is one of the most common and pathogenic bacteria causing severe conditions in both pregnant women and mainly newborns, the composition of the present invention may represent a potential alternative approach for the prevention and treatment of GBS infection during pregnancy.

Example 8

Ongoing Clinical Study

A multicentric, double-blind, randomized, placebo-controlled clinical trial is ongoing, in order to assess the efficacy of the composition according to the invention in the prevention of GBS infection in pregnant women.

The study will start only after a written approval obtained from the Independent Ethics Committee at respective sites and communication to the Italian Ministry of Health. The trial will be conducted in accordance with the Declaration of Helsinki, (Fortaleza, Brazil, and October, 2013) and Good clinical practice.

410 pregnant women (from $32^{nd}$ to $37^{th}$ week of pregnancy) will be enrolled and randomly divided into 2 groups (verum or placebo) according to the treatment. The recruitment will be performed at the University of Modena (coordinator), University of Milan, and University of Trieste.

All women will be recruited if they are adult (>18 years) and pregnant at low obstetric risk with rectal-vaginal swab positive to GBS; pregnancy within the $33^{rd}$ week and prevision of vaginal delivery.

Exclusion criteria include pregnant women with urine positive to GBS; women with previous infants with early sepsis; use of antibiotics one month before enrolment; incapacity to understand the study and sign the informed consent.

The primary endpoint is the rate of pregnant women with GBS colonization (carriers) at the pre-partum screening (35-$37^{th}$ week).

The secondary endpoints include the rate of women treated with antibiotics during the delivery; the rate of women with early rupture of membranes; Apgar score >8 at 5^ minute; the rate of newborns receiving antibiotics during the first 48 hours of life; the rate of newborns with early GBS sepsis; and safety and tolerability of investigational product/placebo.

The treatment consists in oral administration of 1 capsule per day of either investigation product (both lactobacilli in combination with lactoferrin) or placebo from $32^{nd}$ to $37^{th}$ week of pregnancy. Each capsule of verum contains $5 \times 10^9$ CFU of lactobacilli (i.e. *L. acidophilus* and *L. rhamnosus*) and 50 mg of lactoferrin.

During the study, rectal and vaginal swabs will be collected from each woman for the GBS analysis according to the current clinical practice. A follow-up visit will be performed after the delivery in order to assess the GBS colonization in newborns.

In addition, on a sub-group of 20 women per each center, an additional vaginal swab will be collected during the assessment of $35-37^{th}$ week. It will be used for demonstrating the vaginal colonization of 2 lactobacilli strains included in investigational product and for assessing the vaginal microbiota and cytokines profiles by molecular approach (extraction and isolation of bacterial DNA from the swabs; 16S rDNA sequence; RT-PCR analysis).

Safety will be assessed by recording adverse events.

All data will be showed as absolute or relative frequencies. The primary and secondary endpoints will be compared between the 2 study arms by using a 2 tailed Z test.

From the above description and the above-noted examples, the advantage attained by the composition described and obtained according to the present invention are apparent.

*bacillus rhamnosus*, and lactoferrin, wherein said strain of *Lactobacillus acidophilus* has a 16s region having at least 95% identity with the sequence of SEQ ID NO:1.

2. The method according to claim 1, wherein said strain of *Lactobacillus acidophilus* and said strain of *Lactobacillus rhamnosus* are each independently of each other in a total concentration in a range from $10^7$ to $10^{12}$ CFU/dose.

3. The method according to claim 1, wherein said strain of *Lactobacillus acidophilus* is selected from the group consisting of *L. acidophilus* deposited with deposit number LMG S-29159, *L. acidophilus* GLA-14 and *L. acidophilus* La 14.

4. The method according to claim 1, wherein said strain of *Lactobacillus rhamnosus* is selected from the group consisting of *L. rhamnosus* deposited with deposit number SD5675, *L. rhamnosus* Lr-32, *L. rhamnosus* GG, *L. rhamnosus* GR-1 and *L. rhamnosus* SP-1.

5. The method according to claim 1, wherein said strain of *Lactobacillus acidophilus* has a 16s region having 100% identity with the sequence of SEQ ID NO:1.

6. The method according to claim 1, wherein said strain of *Lactobacillus acidophilus* is deposited with deposit number LMG S-29159 and said strain of *Lactobacillus rhamnosus* is deposited with deposit number SD5675.

7. The method according to claim 1, wherein said lactoferrin is in a total concentration in a range from 5 mg/dose to 300 mg/dose.

8. The method according to claim 1, further comprising at least one additional component selected from the group consisting of: minerals, vitamins, probiotics, prebiotics, proteins and mixtures thereof.

The invention claimed is:

1. A method for treating Group-B *Streptococcus* (GBS) infections in a woman in need thereof, wherein said Group-B *Streptococcus* (GBS) infections occur during or after pregnancy of said woman said method comprising: administering to said woman a composition comprising a strain of *Lactobacillus acidophilus*, a strain of *Lacto-*

9. The method according to claim 8, wherein said minerals are selected from the group consisting of calcium, phosphorus, copper, magnesium, potassium, iron, selenium, sodium, zinc, manganese, chloride and iodine, said vitamins are selected from the group consisting of vitamin A, vitamin B1 (thiamin), vitamin B2 (riboflavin), vitamin B3 (niacin) vitamin B6, vitamin B8 (biotin), vitamin B12, vitamin C, vitamin D, vitamin E and folic acid, said probiotics are selected from the group consisting of *Bifidobacterium* or lactic acid bacteria selected from the group consisting of *Lactobacillus bulgaricus, Lactobacillus casei, Lactobacillus bifidus Lactobacillus reuteri, Lactobacillus crispatus, Lactobacillus gasseri, Lactobacillus plantarum, Lactobacillus jensenii, Lactobacillus delbrueckii, Lactobacillus fermentum, Lactobacillus helveticus, Lactobacillus iners* and said proteins are selected from whey and casein.

10. The method according to claim 1, comprising *Lactobacillus acidophilus* in a range from $10^7$ to $10^{12}$ CFU/dose, *Lactobacillus rhamnosus* in a range from $10^7$ to $10^{12}$ CFU/dose, lactoferrin in a range from 5 mg/dose to 300 mg/dose and pharmaceutically acceptable excipients.

11. The method according to claim 1 wherein said composition is used in a daily dosage in the range from $10^7$ to $10^{12}$ CFU/dose in combination with lactoferrin in the range from 5 mg/dose to 300 mg/dose.

12. The method according to claim 1, wherein said composition is for oral administration.

13. The method according to claim 1, wherein said composition is in solid, liquid or semi-liquid form, selected from the group consisting of a tablet, a capsule, a powder, a granulate, a soluble stick and a liquid suspension.

14. The method according to claim 1, wherein said strain of *Lactobacillus acidophilus* and said strain of *Lactobacillus rhamnosus* are each independently of each other in a total concentration of $10^9$ CFU/dose.

15. The method according to claim 7, wherein said lactoferrin is bovine lactoferrin.

16. The method according to claim 7, wherein said lactoferrin, is in a total concentration of 50 mg/dose.

17. The method according to claim 11 wherein said composition is used in a daily dosage of $10^9$ CFU/dose.

18. The method according to claim 11 wherein said composition is in combination with lactoferrin in an amount of 50 mg/dose.

* * * * *